US007761294B2

(12) United States Patent
Kim

(10) Patent No.: US 7,761,294 B2
(45) Date of Patent: Jul. 20, 2010

(54) SPEECH DISTINCTION METHOD

(75) Inventor: Chan-Woo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1168 days.

(21) Appl. No.: 11/285,353

(22) Filed: Nov. 23, 2005

(65) Prior Publication Data

US 2006/0111900 A1 May 25, 2006

(30) Foreign Application Priority Data

Nov. 25, 2004 (KR) ...................... 10-2004-0097650

(51) Int. Cl.
*G10L 15/20* (2006.01)
*G10L 21/02* (2006.01)
*G10L 15/00* (2006.01)

(52) U.S. Cl. ........................ 704/233; 704/226; 704/240

(58) Field of Classification Search ........................ None
See application file for complete search history.

(56) References Cited

U.S. PATENT DOCUMENTS 6,349,278 B1 * 2/2002 Krasny et al. ............... 704/233
6,615,170 B1 9/2003 Liu et al.
6,691,087 B2 * 2/2004 Parra et al. .................. 704/240
2002/0165713 A1 11/2002 Skoglund et al.
2004/0122667 A1 6/2004 Lee et al.

FOREIGN PATENT DOCUMENTS

KR 10-0303477 B1 9/2001

OTHER PUBLICATIONS

Sohn et al., "A statistical model-based voice activity detection," IEEE Signal Processing Letters, vol. 6, No. 1, pp. 1-3, 1999.*

Cho et al., "Improved voice activity detection based on a smoothed statisticallikelihood ratio," IEEE Transactions on Speech and Audio Processing, vol. 2, pp. 737-740, 2001.*

Gazor et al., "A soft voice activity detector based on a Laplacian-Gaussian model," IEEE Transactions on Speech and Audio Processing, vol. 11, No. 5, pp. 498-505, 2003.*

Othman et al., "A Semi-Continuous State Transition Probability HMM-Based Voice Activity Detection," IEEE, May 2004, pp. 821-824.

Rabiner, " A Tutorial on Hidden Markov Models and Selected Applications in Speech Recognition," Proceedings of the IEEE, Feb. 1989, No. 2, pp. 257-285, XP-000099251.

(Continued)

*Primary Examiner*—Brian L Albertalli
(74) *Attorney, Agent, or Firm*—Birch, Stewart, Kolasch & Birch, LLP

(57) ABSTRACT

A speech distinction method, which includes dividing an input voice signal into a plurality of frames, obtaining parameters from the divided frames, modeling a probability density function of a feature vector in state j for each frame using the obtained parameters, and obtaining a probability $P_0$ that a corresponding frame will be a noise frame and a probability $P_1$ that the corresponding frame will be a speech frame from the modeled PDF and obtained parameters. Further, a hypothesis test is performed to determine whether the corresponding frame is a noise frame or speech frame using the obtained probabilities $P_0$ and $P_1$.

24 Claims, 2 Drawing Sheets

OTHER PUBLICATIONS

Sadaoki Furui, "Speech Information Processing", 1st Edition, Morikita Publishing Co., Ltd., Jun. 30, 1998, pp. 98-100.
"Estimation of Noise Suppression by AURORA2-J based on FMM and EM Algorithm", Mar. 17, 2004, 2-11-8, p. 115-116.
Binder, "Speech Non-Speech Separation with GMMs", Oct. 2, 2001, 1-Q-1, p. 141-142.
McKinley et al., "Model Based Speech Pause Detection", Acoustics, Speech, and Signal Processing, IEEE Comput. Soc., US, vol. 2, pp. 1179-1182, 1997. ISBN:978-0-8186-7919-3.
Sarikaya Ruhi et al., "Robust Speech Activity Detection in the Presence of Noise", Robust Speech Processing Laboratory, Duke University, pp. 1455-1458, 1998.

* cited by examiner

SPEECH DISTINCTION METHOD

This application claims priority to Korean Application No. 10-2004-0097650 filed on Nov. 25, 2004, the entire contents of which is incorporated by reference in its entirety.

BACKGROUND OF THE INVENTION

1. Field of the Invention

The present invention relates to a speech detection method, and more particularly to a speech distinction method that effectively determines speech and non-speech (e.g., noise) sections in an input voice signal including both speech and noise data.

2. Description of the Background Art

A previous study indicates a typical phone conversation between two people includes about 40% of speech and 60% of silence. During the silence period, noise data is transmitted. Further, the noise data may be coded at a lower bit rate than for speech data using Comfort Noise Generation (CNG) techniques. Coding an input voice signal (which includes noise and speech data) at different coding rates is referred to as variable-rate coding. In addition, variable-rate speech coding is commonly used in wireless telephone communications. To effectively perform variable-rate speech coding, a speech section and a noise section are determined using a voice activity detector (VAD).

In the standard G.729 released by the Telecommunication Standardization Sector of the International Telecommunications Union (ITU-T), parameters such as a line spectral density (LSF), a full band energy ($E_f$), a low band energy ($E_l$), a zero crossing rate (ZC), etc. of the input signal are obtained. A spectral distortion ($\Delta S$) of the signal is also obtained. Then, the obtained values are compared with specific constants that have been previously determined by experimental results to determine whether a particular section of the input signal is a speech section or a noise section.

In addition, in the GSM (Global System for Mobile communication) network, when a voice signal is input (including noise and speech), a noise spectrum is estimated, a noise suppression filter is constructed using the estimated spectrum, and the input voice signal is passed through noise suppression filter. Then, the energy of the signal is calculated, and the calculated energy is compared to a preset threshold to determine whether a particular section is a speech section or a noise section.

The above-noted methods require a variety of different parameters, and determine whether the particular section of the input signal is a speech section or noise section based on previously determined empirical data, namely, past data. However, the characteristics of speech are very different for each particular person. For example, the characteristics of speech for people at different ages, whether a person is a male or female, etc. change the characteristic of speech. Thus, because the VAD uses the previously determined empirical data, the VAD does not provide an optimum speech analysis performance.

Another speech analysis method to improve on the empirical method uses probability theories to determine whether a particular section of an input signal is a speech section. However, this method is also disadvantageous because it does not consider the different characteristics of noises, which have various spectrums based on any one particular conversation.

SUMMARY OF THE INVENTION

Accordingly, one object of the present invention is to address the above-noted and other problems.

Another object of the present invention is to provide a speech distinction method that effectively determines speech and noise sections in an input voice signal, including both speech and noise data.

To achieve these and other advantages and in accordance with the purpose of the present invention, as embodied and broadly described herein, there is provided a speech distinction method. The speech detection method in accordance with one aspect of the present invention includes dividing an input voice signal into a plurality of frames, obtaining parameters from the divided frames, modeling a probability density function of a feature vector in state j for each frame using the obtained parameters, and obtaining a probability $P_0$ that a corresponding frame will be a noise frame and a probability $P_1$ that the corresponding frame will be a speech frame from the modeled PDF and obtained parameters. Further, a hypothesis test is performed to determine whether the corresponding frame is a noise frame or speech frame using the obtained probabilities $P_0$ and $P_1$.

In accordance with another aspect of the present invention, there is provided a computer program product for executing computer instructions including a first computer code configured to divide an input voice signal into a plurality of frames, a second computer code configured to obtain parameters for the divided frames, a third computer code configured to model a probability density function of a feature vector in state j for each frame using the obtained parameters, and a fourth computer code configured to obtain a probability $P_0$ that a corresponding frame will be a noise frame and a probability $P_1$ that the corresponding frame will be a speech frame from the modeled PDF and obtained parameters. Also included is a fifth computer code configured to perform a hypothesis test to determine whether the corresponding frame is a noise frame or speech frame using the obtained probabilities $P_0$ and $P_1$.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

An algorithm of a speech distinction method in accordance with one embodiment of the present invention uses the following two hypotheses:

1) $H_0$: is a noise section including only noise data.

2) $H_1$: is a speech section including speech and noise data.

To test the above hypotheses, a reflexive algorithm is performed, which will be discussed with reference to the flowchart shown in FIG. 1.

Figure 1:
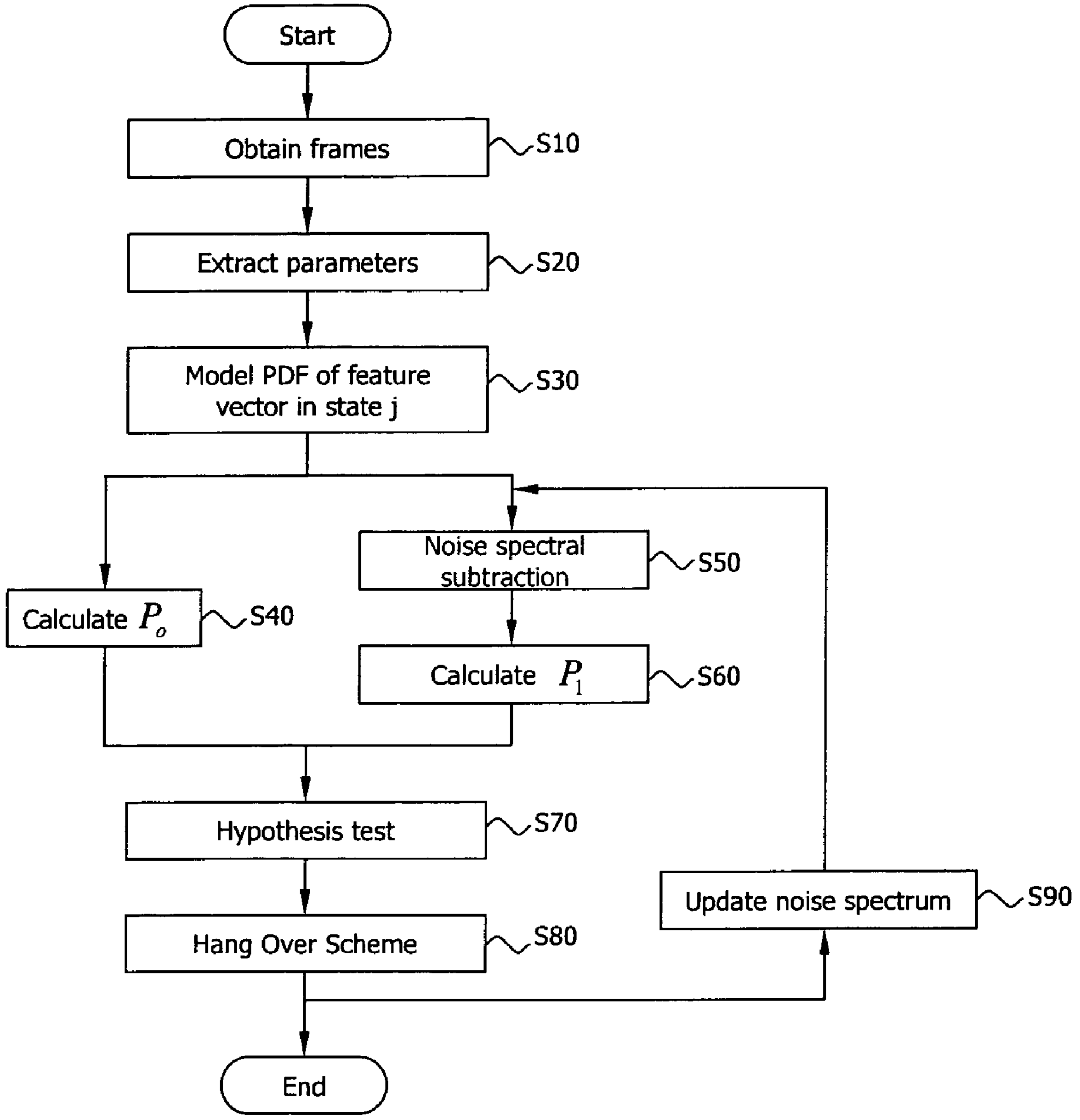
FIG. 1 is a flowchart showing a speech distinction method in accordance with one embodiment of the present invention.

Referring to FIG. 1, an input voice signal is divided into a plurality of frames (S10). In one example, the input voice signal is divided into 10 ms interval frames. Further, when the entire voice signal is divided into the 10 ms interval frames, the value of each frame is referred to as the 'state' in a probability process.

After the input signal has been divided into a plurality of frames, a set of parameters is obtained from the divided frames (S20). The parameters include, for example, a speech feature vector o obtained from a corresponding frame; a mean vector $m_{jk}$ of a feature of a $k^{th}$ mixture in state j; a weighting value $c_{jk}$ for the $k^{th}$ mixture in state j; a covariance matrix $C_{jk}$ for the $k^{th}$ mixture in state j; a prior probability $P(H_0)$ that one frame will correspond to a silent or noise frame; a prior probability $P(H_1)$ that one frame will correspond to a speech frame; a conditional probability $P(H_{0,j}|H_0)$ that a current state will be the $j^{th}$ state of a silence or noise frame assuming the frame includes silence; and a conditional probability $P(H_{1,j}|H_1)$ that a current state will be the $j^{th}$ state of a speech frame assuming the speech frame includes speech.

The above-noted parameters can be obtained via a training process, in which actual voices and noises are recorded and stored in a speech database. A number of states to be allocated to speech and noise data are determined by a corresponding application, a size of a parameter file and an experimentally obtained relation between the number of states and the performance requirements. The number of mixtures is similarly determined.

Figure 2A:
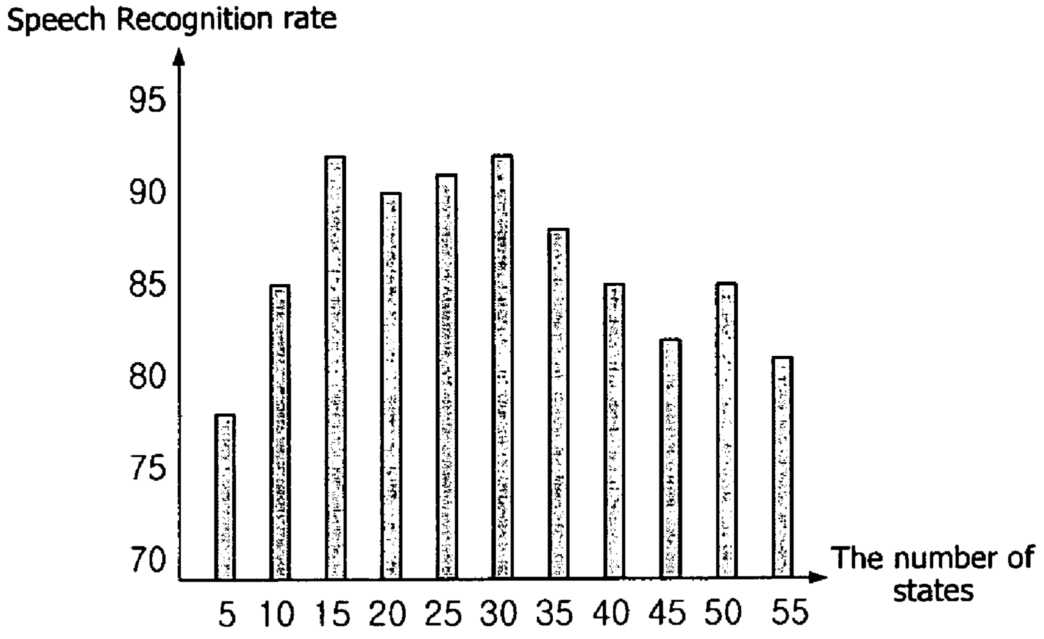
FIGS. 2A and 2B are diagrams showing experimental results performed to determine a number of states and mixtures, respectively.
Figure 2B:
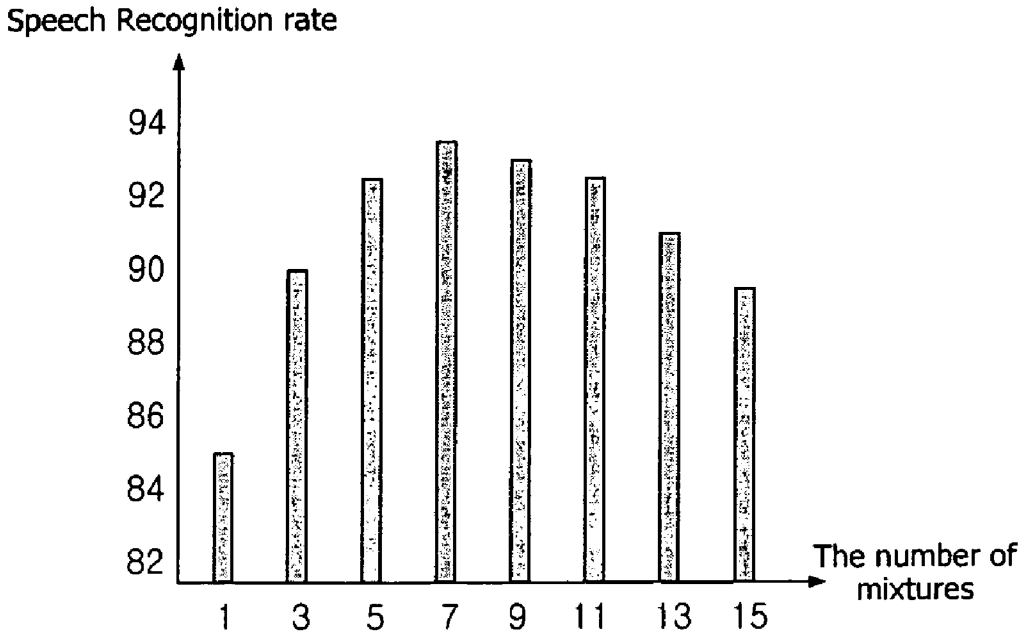

For example, FIGS. 2A and 2B are diagrams illustrating experimental results used in determining a number of states and mixtures. In more detail, FIGS. 2A and 2B are diagrams showing a speech recognition rate according to the number of states and mixtures, respectively. As shown in FIG. 2A, the speech recognition rate is decreased when the number of states is too small or too large. Similarly, as shown in FIG. 2B, the speech recognition rate is decreased when the number of mixtures is too small or too large. Therefore, the number of states and mixtures are determined using an experimentation process. In addition, a variety of parameter estimation techniques may be used to determine the above-noted parameters such as the Expectation-Maximization algorithm (E-M algorithm).

Further, with reference to FIG. 1, after the parameters are extracted in step (S20), a probability density function (PDF) of a feature vector in state j is modeled by a Gaussian mixture using the extracted parameters (S30). A log-concave function or an elliptically symmetric function may also be used to calculate the PDF.

The PDF method using the Gaussian mixture is described in 'Fundamentals of Speech Recognition (Englewood Cliffs, N.J.: Prentice Hall, 1993)' written by L. R. Rabiner and B-H. HWANG, and 'An introduction to the application of the theory of probabilistic functions of a Markov process to automatic speech recognition (Bell System Tech. J., April 1983) written by S. E. Levinson, L. R. Rabiner and M. M. Sondhi, both of which are hereby incorporated in their entirety. Because this method is well known, a detailed description will be omitted.

In addition, the PDF of a feature vector in state j using the Gaussian mixture is expressed by the following equation:

$$b_j(\underline{o}) = \sum_{k=1}^{N_{mix}} c_{jk} N(\underline{o}, \underline{m}_{jk}, C_{jk})$$

Here, N means the total number of sample vectors.

Next, the probabilities $P_0$ and $P_1$ are obtained using the calculated PDF and other parameters. In more detail, the probability $P_0$ that a corresponding frame will be a silence or noise frame is obtained from the extracted parameters (S40), and a probability $P_1$ that the corresponding speech frame will be a speech frame is obtained from the extracted parameters (S60). Further, both probabilities $P_0$ and $P_1$ are calculated because it is not known whether the frame will be a speech frame or a noise frame.

Further, the probabilities $P_0$ and $P_1$ may be calculated using the following equations:

$$P_0 = \max_j(b_j(\underline{o}) \cdot P(H_{0,j}|H_0)) = \max_j\left(\sum_{k=1}^{N_{mix}} c_{jk} N(\underline{o}, \underline{m}_{jk}, C_{jk}) \cdot P(H_{0,j}|H_0)\right)$$

$$P_1 = \max_j(b_j(\underline{o}) \cdot P(H_{1,j}|H_1)) = \max_j\left(\sum_{k=1}^{N_{mix}} c_{jk} N(\underline{o}, \underline{m}_{jk}, C_{jk}) \cdot P(H_{1,j}|H_1)\right)$$

Also, as shown in FIG. 1, prior to calculating the probability $P_1$, a noise spectral subtraction process is performed on the divided frame (S50). The subtraction technique uses previously obtained noise spectrums.

In addition, after the probabilities $P_0$ and $P_1$ are calculated, a hypothesis test is performed (S70). The hypothesis test is used to determine whether a corresponding frame is a noise frame or a speech frame using the calculated probabilities $P_0$, $P_1$ and a particular criterion from an estimation statistical value standard. For example, the criterion may be a MAP (Maximum a posteriori) criterion defined by the following equation:

$$\frac{P_0}{P_1} \underset{H_1}{\overset{H_0}{\gtrless}} \eta, \text{ Here, } \eta = \frac{P(H_1)}{P(H_0)}.$$

Other criterions may also be used such as a maximum likelihood (ML) minimax criterion, a Neyman-Pearson test, a CFAR (Constant False Alarm Rate) test, etc.

Then, after the hypothesis test, a Hang Over Scheme is applied (S80). The Hang over scheme is used to prevent low energy sounds such as "f," "th," "h," and the like from being wrongly determined as noise due to other high energy noises, and to prevent stop sounds such as "k," "p," "t," and the like (which are sounds having at first a high energy and then a low energy) from being determined as a silence when they are spoken with low energy. Further, if a frame is determined as being a noise frame and the frame is between multiple frames that were determined to be speech frames, the Hang over scheme arbitrarily decides the silence frame is a speech frame because speech does not suddenly change into silence when small 10 ms interval frames are being considered.

In addition, if a corresponding frame is determined as a noise frame after the Hang over scheme is applied, a noise spectrum is calculated for the determined noise frame. Thus, in accordance with one embodiment of the present invention, the calculated noise spectrum may be used to update the noise spectral subtraction process performed in step S50 (S90). Further, the Hang over scheme and the noise spectral subtraction process in steps S80 and S50, respectively, can be selectively performed. That is, one or both of these steps may be omitted.

As so far described, in the speech distinction method in accordance with one embodiment of the present invention, speech and noise (silence) sections are processed as states, respectively, to thereby adapt to speech or noise having various spectrums. Also, a training process is used on noise data collected in a database to provide an effective response to different types of noise. In addition, in the present invention, because stochastically optimized parameters are obtained by methods such as the E-M algorithm, the process of determining whether a frame is a speech or noise frame is improved.

Further, the present invention may be used to save storage space by recording only a speech part and not the noise part during voice recording, or may be used as a part of an algorithm for a variable rate coder in a wire or wireless phone.

This invention may be conveniently implemented using a conventional general-purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for distinguishing speech with a voice activity detector including a processor and a memory, the method comprising:

dividing, via the processor, an input voice signal into a plurality of frames;

obtaining, via the processor, parameters from the divided frames;

modeling, via the processor, a probability density function of a feature vector in state j for each frame using the obtained parameters;

obtaining, via the processor, a maximum probability P0 of each state that a corresponding frame will be a noise frame and a maximum probability P1 of each state that the corresponding frame will be a speech frame from the modeled PDF and obtained parameters;

performing, via the processor, a hypothesis test to determine whether the corresponding frame is a noise frame or speech frame using the obtained probabilities P0 and P1; and storing data corresponding to the determined speech frame in the memory.

2. The method of claim 1, wherein the parameters comprise:

a speech feature vector o obtained from a frame;

a mean vector $m_{jk}$ of a feature of a $k^{th}$ mixture in state j;

a weighting value $c_{jk}$ for the $k^{th}$ mixture in state j;

a covariance matrix $C_{jk}$ for the $k^{th}$ mixture in state j;

a prior probability $P(H_0)$ that one frame will be a noise frame;

a prior probability $P(H_1)$ that one frame will be a speech frame;

a conditional probability $P(H_{0,j}|H_0)$ that a current state will be the $j^{th}$ state of a noise frame when assuming the frame is a noise frame; and a conditional probability $P(H_{1,j}|H_1)$ that a current state will be the $j^{th}$ state of speech frame when assuming the frame is a speech frame.

3. The method of claim 2, wherein a number of states and mixtures are determined based on a required performance, a size of a parameter file and an experimentally obtained relationship between the number of states and mixtures and the required performance.

4. The method of claim 1, wherein the parameters are obtained using a database containing actual speech and noise which are collected and recorded.

5. The method of claim 1, wherein the probability density function is modeled using a Gaussian mixture, a log-concave function or an elliptically symmetric function.

6. The method of claim 5, wherein the probability density function using the Gaussian mixture is expressed by the following equation:

$$b_j(\underline{o}) = \sum_{k=1}^{N_{mix}} c_{jk} N(\underline{o}, \underline{m}_{jk}, C_{jk}).$$

7. The method of claim 1, wherein the probability P0 that the frame will be a noise frame is obtained by the following equation:

$$P_0 = \max_j (b_j(\underline{o}) \cdot P(H_{0,j}|H_0)) = \max_j \left( \sum_{k=1}^{N_{mix}} c_{jk} N(\underline{o}, \underline{m}_{jk}, C_{jk}) \cdot P(H_{0,j}|H_0) \right).$$

8. The method of claim 1, wherein the probability P1 that the frame will be a speech frame is obtained by the following equation:

$$P_1 = \max_j (b_j(\underline{o}) \cdot P(H_{1,j}|H_1)) = \max_j \left( \sum_{k=1}^{N_{mix}} c_{jk} N(\underline{o}, \underline{m}_{jk}, C_{jk}) \cdot P(H_{1,j}|H_1) \right).$$

9. The method of claim 1, wherein the hypothesis test determines whether the corresponding frame is a speech frame or a noise frame using the probabilities P0 and P1, and a selected criterion.

10. The method of claim 9, wherein the criterion is one of MAP (Maximum a Posteriori) criterion, a maximum likelihood (ML) minimax criterion, a Neyman-Pearson test, and constant false alarm test.

11. The method of claim 10, wherein the MAP criterion is defined by the following equation:

$$\frac{P_0}{P_1} \underset{H_1}{\overset{H_0}{\gtrless}} \eta, \eta = \frac{P(H_1)}{P(H_0)}.$$

12. The method of claim 1, further comprising:
selectively performing a noise spectral subtraction process on a corresponding frame using previously obtained noise spectrum results before obtaining the probability P1.

13. The method of claim 1, further comprising:
selectively applying a Hang Over Scheme after performing the hypothesis test.

14. The method of claim 12, further comprising:
updating the noise spectral subtraction process with a current noise spectrum of a determined noise frame when the corresponding frame is determined as a noise frame.

15. A voice activity detector for distinguishing speech, comprising:
a processor configured to divide an input voice signal into a plurality of frames, to obtain parameters for the divided frames, to model a probability density function of a feature vector in state j for each frame using the obtained parameters, to obtain a maximum probability P0 of each state that a corresponding frame will be a noise frame and a maximum probability P1 of each state that the corresponding frame will be a speech frame from the modeled PDF and obtained parameters, and to perform a hypothesis test to determine whether the corresponding frame is a noise frame or speech frame using the obtained probabilities P0 and P1; and
a storage medium configured to store a program performed by the processor.

16. The voice activity detector of claim 15, wherein the parameters comprise:
a speech feature vector o obtained from a frame;
a mean vector $m_{jk}$ of a feature of a kth mixture in state j;
a weighting value $c_{jk}$ for the kth mixture in state j;
a covariance matrix $C_{jk}$ for the kth mixture in state j;
a prior probability $P(H_0)$ that one frame will be a noise frame;
a prior probability $P(H_1)$ that one frame will be a speech frame;
a conditional probability $P(H_{0,j}|H_0)$ that a current state will be the jth state of a noise frame when assuming the frame is a noise frame; and
a conditional probability $P(H_{1,j}|H_1)$ that a current state will be the jth state of speech frame when assuming the frame is a speech frame.

17. The voice activity detector of claim 15, wherein the probability density function is modeled using a Gaussian mixture and is expressed by the following equation:

$$b_j(\underline{o}) = \sum_{k=1}^{N_{mix}} c_{jk} N(\underline{o}, \underline{m}_{jk}, C_{jk}).$$

18. The voice activity detector of claim 15, wherein the probability P0 that the frame will be a noise frame is obtained by the following equation:

$$P_0 = \max_j (b_j(\underline{o}) \cdot P(H_{0,j}|H_0)) = \max_j \left( \sum_{k=1}^{N_{mix}} c_{jk} N(\underline{o}, \underline{m}_{jk}, C_{jk}) \cdot P(H_{0,j}|H_0) \right).$$

19. The voice activity detector of claim 15, wherein the probability P1 that the frame will be a speech frame is obtained by the following equation:

$$P_1 = \max_j (b_j(\underline{o}) \cdot P(H_{1,j}|H_1)) = \max_j \left( \sum_{k=1}^{N_{mix}} c_{jk} N(\underline{o}, \underline{m}_{jk}, C_{jk}) \cdot P(H_{1,j}|H_1) \right).$$

20. The voice activity detector of claim 15, wherein the processor is further configured to determine whether the corresponding frame is a speech frame or a noise frame using the probabilities P0 and P1, and a selected criterion.

21. The voice activity detector of claim 20, wherein the criterion is one of MAP (Maximum a Posteriori) criterion, a maximum likelihood (ML) minimax criterion, a Neyman-Pearson test, and constant false alarm test.

22. The voice activity detector of claim 21, wherein the MAP criterion is defined by the following equation:

$$\frac{P_0}{P_1} \underset{H_1}{\overset{H_0}{\gtrless}} \eta, \eta = \frac{P(H_1)}{P(H_0)}.$$

23. The voice activity detector of claim 15, processor is further configured to selectively perform a noise spectral subtraction process on a corresponding frame using previously obtained noise spectrum results before obtaining the probability P1.

24. The voice activity detector of claim 23, processor is further configured to update the noise spectral subtraction process with a current noise spectrum of a determined noise frame when the correspond.

* * * * *